United States Patent
Knagge

(10) Patent No.: US 7,578,215 B2
(45) Date of Patent: Aug. 25, 2009

(54) ADJUSTABLE BEARING BALL HAVING MULTIPLE PARTS

(75) Inventor: Martin Knagge, Seesen (DE)

(73) Assignee: Teleflex Automotive Germany GmbH, Dassel (DE)

( * ) Notice: Subject to any disclaimer, the term of this patent is extended or adjusted under 35 U.S.C. 154(b) by 574 days.

(21) Appl. No.: 10/850,112

(22) Filed: May 20, 2004

(65) Prior Publication Data

US 2005/0005726 A1    Jan. 13, 2005

(51) Int. Cl.
*F16C 11/06*    (2006.01)
*F16C 11/00*    (2006.01)
*F16H 59/04*    (2006.01)

(52) U.S. Cl. ................. 74/473.34; 74/471; 74/473.1; 74/473.33; 403/114; 403/131; 403/132; 403/133

(58) Field of Classification Search ............ 74/473, 74/29, 491, 473.34, 471, 473.1, 473.33; 403/114, 403/131, 140, 132, 133; *F16C 11/06; B60K 20/02*
See application file for complete search history.

(56) References Cited

U.S. PATENT DOCUMENTS

| | | | | | |
|---|---|---|---|---|---|
| 3,273,924 | A | * | 9/1966 | Maxeiner | 403/140 |
| 3,384,397 | A | * | 5/1968 | Wehner | 403/140 |
| 4,334,795 | A | * | 6/1982 | Westphal | 403/131 |
| 4,360,284 | A | * | 11/1982 | Brandenburg | 403/133 |
| 4,492,130 | A | * | 1/1985 | Lamy et al. | 74/473.29 |
| 4,662,772 | A | * | 5/1987 | Schultz | 403/114 |
| 5,213,002 | A | * | 5/1993 | Langhof et al. | 74/473.29 |
| 2007/0137367 | A1 | * | 6/2007 | Papa et al. | 74/473.34 |

FOREIGN PATENT DOCUMENTS

| | | | |
|---|---|---|---|
| DE | 3341878 A1 | * | 5/1985 |
| DE | 692 10 981 T2 | | 1/1997 |
| DE | 10325536 | | 12/2004 |
| EP | 0552521 | | 7/1993 |
| EP | 0 792 768 A1 | | 9/1997 |
| JP | 7-132751 | * | 5/1995 |
| WO | WO 90/15935 | * | 12/1990 |

OTHER PUBLICATIONS

English Abstract of DE 3341878 A1, May 30, 1985.*

* cited by examiner

*Primary Examiner*—Vinh T. Luong
(74) *Attorney, Agent, or Firm*—Baker & Hostetler LLP

(57) ABSTRACT

The position of a lever is adjustable relative to its bearing via a locking clip that is arranged opposite to a catch. The lever is arranged in a bearing shell with a ball therein in which the lever is arranged so as to be displaceable with the catch attached. The locking clip is guided in the walls of the ball, and the locking of the locking clip and catch in the closed state of the bearing shell forms a positive engagement. The adjustable ball bearing apparatus for shift levers and selector levers compensates for tolerances in the installation of a lever between the ball, the bearing shell, and the axis of the lever.

3 Claims, 3 Drawing Sheets

ADJUSTABLE BEARING BALL HAVING MULTIPLE PARTS

PRIORITY CLAIM

This application claims foreign priority under 35 U.S.C. §119 to German application DE 102 25 536.2 filed Jun. 4, 2003.

BACKGROUND OF THE INVENTION

1. Field of the Invention

The invention is directed to an adjustable bearing ball having multiple parts. The invention is suitable as a bearing ball for the shift lever bearing in motor vehicles and particularly for installation in motor vehicles in which tolerances between the shift housing or bearing housing and cover must be compensated for, for example during final assembly.

2. Description of the Related Art

There is a wide variety of known bearing balls in shift levers. For example, DE 692 10 981 T2 (see also EP0552521) describes a shift lever bearing in which a shift lever arrangement has a shifting rod which extends in a longitudinal direction and has a ball with a partially spherical bearing surface substantially concentric to the shifting rod, the rod being fitted through the ball in order to allow a universal swiveling movement. The ball is arranged between the ends of the rod and remote there from and has at least two shaped bearing bodies providing the bearing surface which are assembled around these rods. Shift lever bearings of this type can easily be fastened at the location provided for them in the vehicle. However, when a cover is provided through which the shift lever projects, stresses can occur in the cover, or at the lever near the opening of the cover surrounding the lever when the opening of the cover is not exactly aligned with the axis of the lever.

EP 0 792 768 A1 discloses a shift lever with a cover and spherical bearing in which stresses can occur in the cover and/or at the shift lever when certain covers are used. These stresses can be prevented through adjustments in the cover and in the bearing for the ball. This calls for a considerable expenditure on assembly or results in premature wear of the cover or bearing of the bearing ball.

SUMMARY OF THE INVENTION

Therefore, the present invention provides possibilities for mounting a lever adjustably in its spherical bearing in such a way that tolerances resulting from installation variables can be compensated for by the invention, for example during final assembly. When the positioning is correct, the bearing is closed and locked. This is accomplished by an adjustable bearing ball apparatus according to the present invention. Other advantageous constructions of the invention are also disclosed and envisioned.

In the solution according to the invention, the bearing ball of the lever, preferably a shift lever or selector lever in a vehicle, is constructed in such a way that the position of the lever within the bearing ball is fixed at the provided location in the vehicle when the bearing ball of the adjustable ball bearing is closed or locked together. Significantly, adjustment can be done during final assembly. For example, when the bearing ball is an unlocked state, for example prior to final assembly and closure of the bearing ball, the final operating position of the lever can be adjusted for smooth operation in relation to any surrounding structures such as a cover. This capability makes the present invention very useful for example, for making final manufacturing adjustments and for preventing permanently incorrect settings which cause undue wear and detract from the user's proper operation.

For this purpose, it is necessary to arrange a locking clip opposite a catch injection molding, which locking clip is displaceable in longitudinal direction. The lever which is surrounded by a ball in a bearing shell advantageously has in its lower portion a catch injection molding transverse to the axis and is displaceable transverse to its axis. In this way, when the bearing ball is in the open or unlocked state, the lever has room to move horizontally relative to the locking clip. The locking clip is guided in and by the walls at the top of the ball, and the locking clip and catch injection molding have a contour forming a positive locking engagement between the catch injection molding and locking clip in the closed state. This locking may be accomplished by a horizontal engagement of interlocking surfaces between the catch injection molding and the locking clip like a zipper or interlocking teeth for example. For example, once the final position is set, and the bearing ball is closed, final assembly is complete and the shift lever is properly located and set up for operation. Thus the shift lever will no longer be freely displaceable axially. The locking clip and catch injection molding can have protruding and interlocking engagement surfaces that are conical or pyramid-shaped, for example. Once the bearing ball is locked, the lever is ready for proper operation because it has been set up to avoid hitting any surrounding parts.

The catch injection molding is advisably arranged in the lower area of the lever and the locking clip is advisably arranged towards the top of the shift lever. The locking clip arranged towards the top can then be moved onto the catch injection molding of the lever or shift lever in such a way that the two catches engage one inside the other resulting in a positive engagement.

The catch injection molding is advantageously injection-molded directly on the shift lever at the bottom. Other advantageous fastening methods such as gluing or the like are also possible.

Further, it is advantageous to have the surfaces of the catch injection molding and locking clip constructed horizontally or generally perpendicular to the lever axis. Of course, diagonal arrangements of the surfaces or shapes other than planar shapes, e.g., curved surfaces which can lock one inside the other, are also possible.

For purposes of quick and advantageous manufacture, the adjustable bearing ball according to the invention can be made of plastic including but not limited to the bearing shell, the locking clip, the ball, and the catch injection molding.

The solution according to the invention has the advantage that after placement of the bearing shell and a cover for the bearing shell in a vehicle for example, the lever, shift lever or selector lever can be adjusted in such a way that tolerances can be compensated quickly and reliably without increased manufacturing costs and without anticipated premature wear of the device. That is, the final positioning, for example of a shift lever, can be done as the last step in overall installation if desired.

The invention will be described more fully in the following with reference to three drawings and an embodiment example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
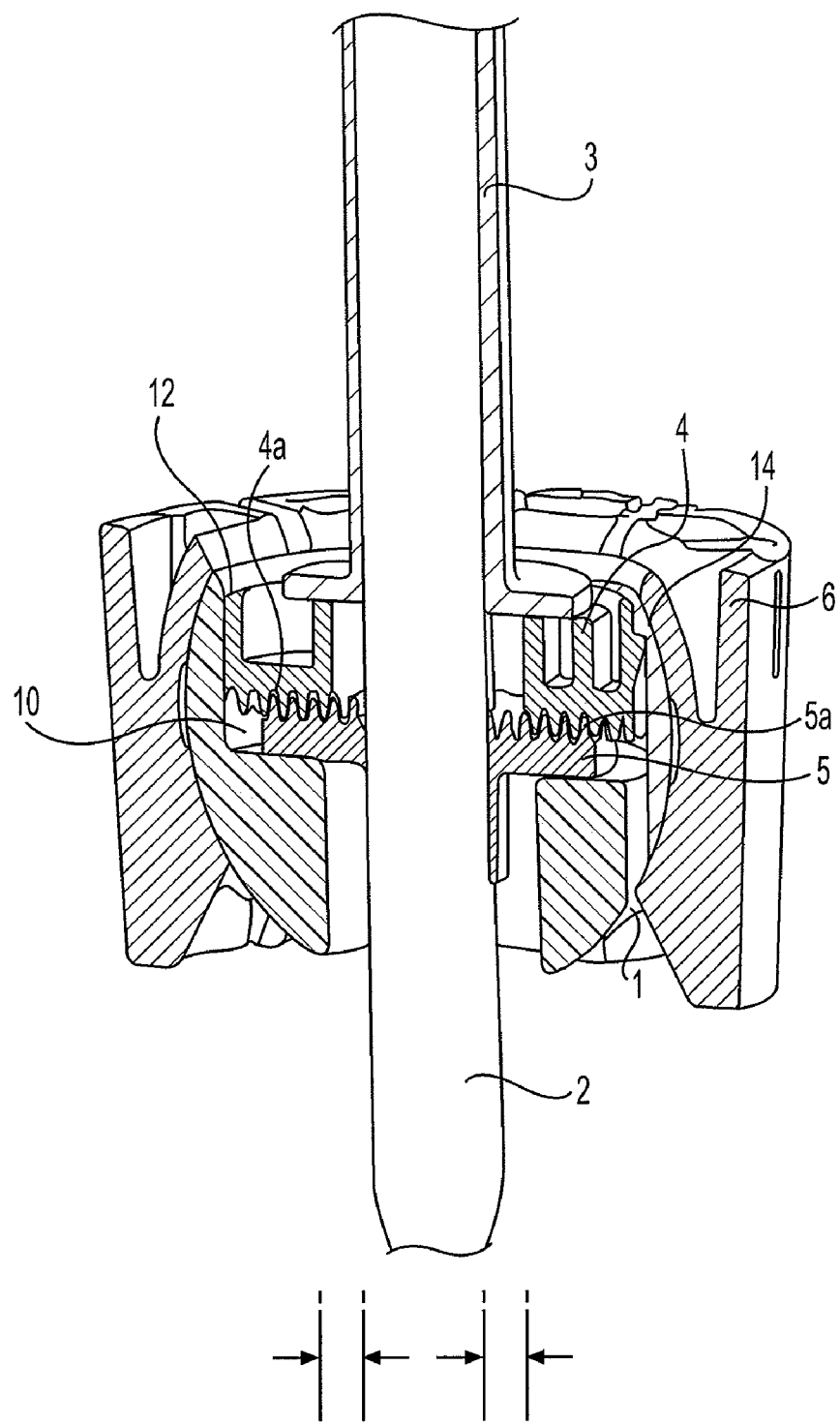
FIG. 1 shows an adjustable bearing ball having multiple parts in the closed state.
Figure 2:
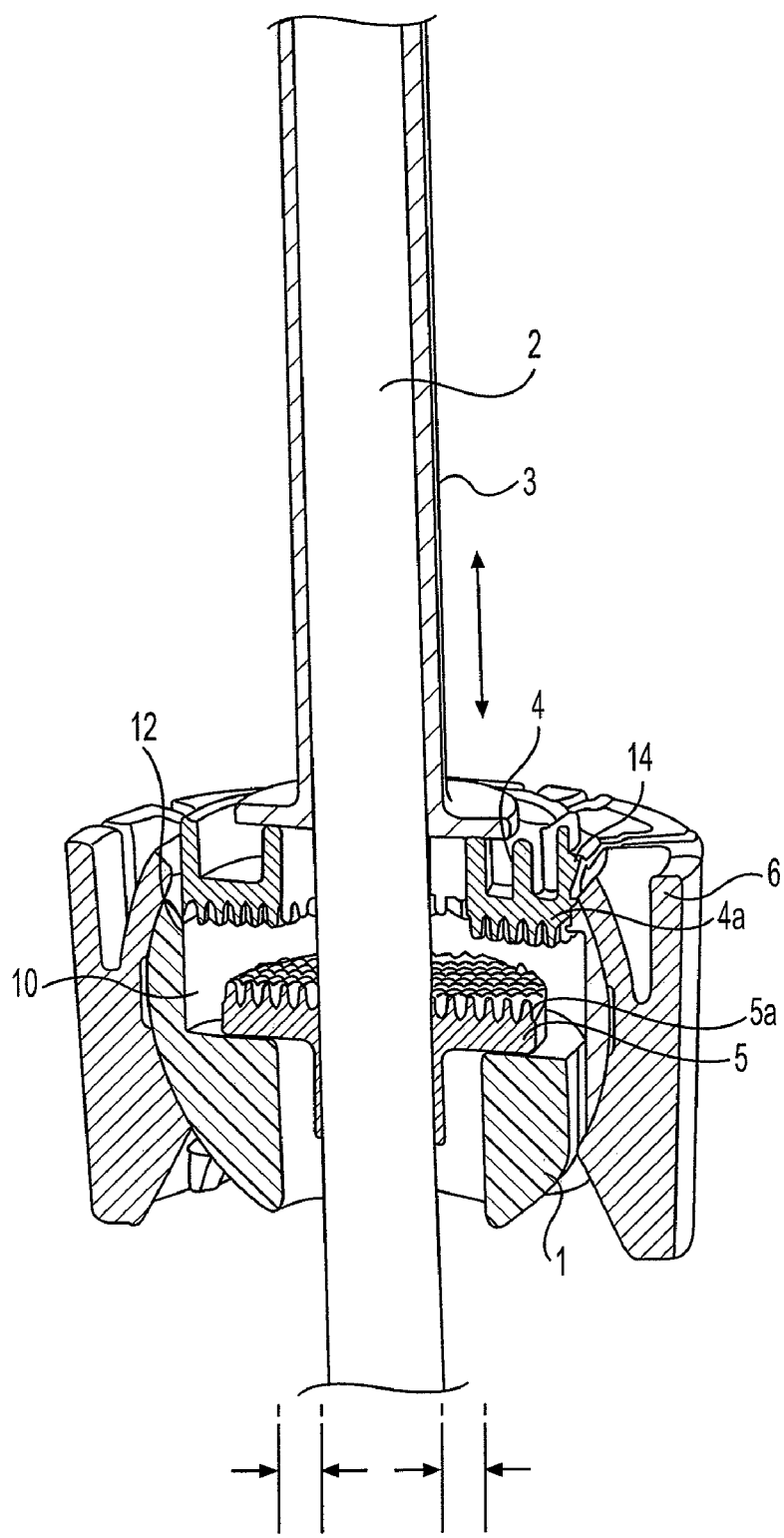
FIG. 2 shows an adjustable bearing ball having multiple parts in the opened state.
Figure 3:
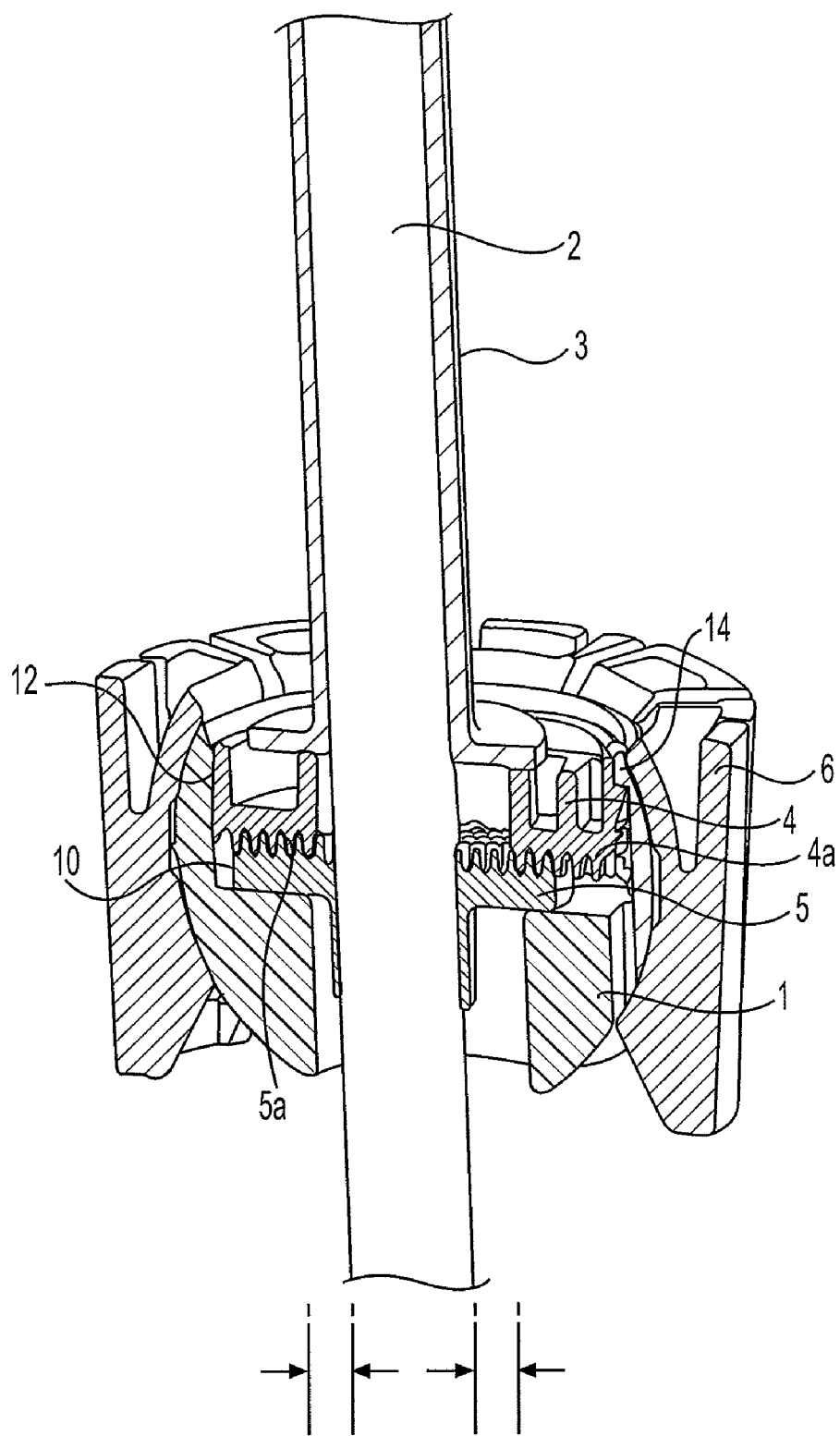
FIG. 3 shows an adjustable bearing ball having multiple parts in the closed state and in an altered position compared to FIG. 1.

FIG. 1 shows the adjustable bearing ball, according to the invention, in which a lever 2 which may be a shift lever or selector lever is guided or located through the ball 1. A catch injection molding 5 is fitted to the lever 2 in such a way that it is fixedly connected to the lever 2. The catch injection molding 5 is displaceable horizontal to the ball 1 and may have protruding catches 5*a*. These may be conical in shape or any other shape. The ball 1 rests in a bearing shell 6 which can be installed at a suitable location in the vehicle. A displaceable actuating sleeve 3 is arranged in the upper area of the lever 2 and is moveably connected to a locking clip 4 so that displaceable actuating sleeve 3 can move horizontally in relation to locking clip 4. Locking clip 4 may likewise have conical catches 4*a* arranged at its underside. The bearing shell 6 is placed in the opening provided for it in a vehicle (not shown). The catch injection molding 5 being fixedly connected to the lever 2, moves with the lever 2 when the lever 2 is adjusted horizontally relative to the ball 1 and the lever 2 is displaceable horizontally in the ball 1 (see FIG. 2). As the locking clip 4 is not attached to the lever 2, and as it is guided by the walls of the ball, the resultant orientation and coordination is that the lever 2 and the catch injection molding 5 move relative to the locking clip 4 as shown by comparing FIG. 1 to FIG. 3 wherein two of the catches 5*a* are shown in FIG. 1 as not engaged on the right side of the catch injection molding whereas in FIG. 3 three catches 5*a* are not engaged. It is noted that a screw driver or other tool may be used to open the latch 14 so that an actuating sleeve 3 as shown in FIG. 2 is not always necessary.

Thus for example, an adjustable selector lever apparatus for use with machines having selector levers or gear shift levers is envisioned and disclosed comprising: a selector lever 2; a catch 5 attached to said selector lever 2, a bearing shell 6, and a ball 1 located in said bearing shell 6. Said ball 1 being structured for receiving said selector lever 2 through its center with space for adjustment of said selector lever 2 in said ball 1 and said ball 1 being structured for receiving said catch 5 in a cut out top section 10 of said ball 1 with space for adjustment of said catch 5 in said cut out top section 10. A locking clip 4 is also located in said cut out top section 10 of said ball 1, and is engageable with said catch 5 to hold and mount said selector lever 2 in a desired operating position in relation to said ball 1 and said bearing shell 6. A latch 14 may be attached to said ball 1 and is structured to engage said locking clip 4 wherein when the apparatus is unlocked (see FIG. 2), said latch 14 does not engage said locking clip 4, and the desired operating position of said selector lever as mounted may be easily adjusted (see arrows) and set up by moving said selector lever 2 axially and then by moving said selector lever 2 to the desired position with said catch attached on said selector lever, thereby freely moving said catch relative to said locking clip; and wherein when the apparatus is locked said locking clip is captured in said cut out top section of said ball by said latch thereby locking said locking clip to said catch. This locking engagement may use teeth or protrusions 4*a*, 5*a* attached to the locking clip 4 and catch 5 respectively. An actuator sleeve 3 may be used to unlock locking clip 4. Also, a screwdriver (not shown) or other tool may be used to unlock locking clip 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A bearing assembly mountable in a vehicle, said bearing assembly comprising:

a lever;

a catch attached to said lever;

a bearing ball having a throughgoing opening adapted to receive said lever, said opening being configured to allow movement of said lever with respect to said bearing ball through a range of transverse positions of adjustment when mounted in the vehicle, said bearing ball including a locking clip configured to move from an open position to a closed position, said locking clip being constructed and arranged so that when said locking clip is in said open position thereof, said lever is adapted to move through the range of transverse positions thereof, and such that when said locking clip is in the closed position thereof, said locking clip engages said catch to lock said lever in a selected transverse position of adjustment, and said locking clip includes a surface having a contour and said catch includes a surface having another contour, such that when said locking clip is in the closed position thereof the contour of said locking clip engages the another contour of said catch so as to lockingly engage said locking clip with said catch, and said surface of said locking clip and said catch are arranged in said bearing ball generally perpendicular to a longitudinal axis of said lever.

2. A bearing assembly mountable in a vehicle, said bearing assembly comprising:

a lever;

a catch attached to said lever;

a bearing ball having a throughgoing opening adapted to receive said lever, said opening being configured to allow movement of said lever with respect to said bearing ball through a range of transverse positions of adjustment when mounted in the vehicle, said bearing ball including a locking clip configured to move from an open position to a closed position, said locking clip being constructed and arranged so that when said locking clip is in said open position thereof, said lever is adapted to move through the range of transverse positions thereof, and such that when said locking clip is in the closed position thereof, said locking clip engages said catch to lock said lever in a selected transverse position of adjustment, and said locking clip is housed within said bearing ball when said locking clip is in the closed position thereof.

3. A bearing assembly mountable in a vehicle, said bearing assembly comprising:

a lever;

a catch attached to said lever;

a bearing ball having a throughgoing opening adapted to receive said lever, said opening being configured to allow movement of said lever with respect to said bearing ball through a range of transverse positions of adjustment when mounted in the vehicle, said bearing ball including a locking clip configured to move from an open position to a closed position, said locking clip being constructed and arranged so that when said locking clip is in said open position thereof, said lever is adapted to move through the range of transverse positions thereof, and such that when said locking clip is in the closed position thereof, said locking clip engages said catch to lock said lever in a selected transverse position of adjustment, and a latch attached to said bearing ball and configured to engage said locking clip when said locking clip is in the closed position thereof.

* * * * *